United States Patent
Tanaka

(10) Patent No.: US 12,003,103 B2
(45) Date of Patent: Jun. 4, 2024

(54) POWER FEEDING DEVICE AND POWER FEEDING SYSTEM INCLUDING THE SAME

(71) Applicant: TMEIC Corporation, Tokyo (JP)

(72) Inventor: Tomohiro Tanaka, Chuo-ku (JP)

(73) Assignee: TMEIC Corporation, Tokyo (JP)

( * ) Notice: Subject to any disclaimer, the term of this patent is extended or adjusted under 35 U.S.C. 154(b) by 163 days.

(21) Appl. No.: 17/655,852

(22) Filed: Mar. 22, 2022

(65) Prior Publication Data

US 2022/0385066 A1  Dec. 1, 2022

(30) Foreign Application Priority Data

May 27, 2021  (JP) .................................. 2021-089250

(51) Int. Cl.
*H02J 7/35*  (2006.01)
*H02J 3/00*  (2006.01)

(52) U.S. Cl.
CPC ................ *H02J 3/007* (2020.01); *H02J 7/35* (2013.01); *H02J 2207/20* (2020.01); *H02J 2300/26* (2020.01)

(58) Field of Classification Search
CPC .......... H02J 3/007; H02J 7/35; H02J 2207/20; H02J 2300/26
See application file for complete search history.

(56) References Cited

U.S. PATENT DOCUMENTS

| | | | |
|---|---|---|---|
| 9,112,371 B2 * | 8/2015 | Wakatabe | H02J 7/0018 |
| 9,153,967 B2 * | 10/2015 | Kim | H02J 3/32 |
| 10,135,282 B2 * | 11/2018 | Ohashi | H02J 3/32 |
| 11,063,447 B2 * | 7/2021 | Kim | H02J 7/0031 |
| 11,791,501 B2 * | 10/2023 | Mitsunaga | H02J 7/007194 |
| | | | 307/46 |

FOREIGN PATENT DOCUMENTS

JP  2015-164373 A  9/2015

* cited by examiner

*Primary Examiner* — Adolf D Berhane
(74) *Attorney, Agent, or Firm* — Oblon, McClelland, Maier & Neustadt, L.L.P.

(57) ABSTRACT

A DC power feeding device includes a power feed line connected to a DC load, a first DC/DC converter provided between a solar battery and the power feed line, and a second DC/DC converter provided between a battery and the power feed line. A first controller controls the first DC/DC converter such that maximum power tracking control of the solar battery is performed in a normal state of a commercial AC power source. The first controller controls the first DC/DC converter such that the solar battery outputs a power smaller than a load power in a power failure. A second controller controls the second DC/DC converter such that the battery is charged in the normal state of the commercial AC power source. The second controller controls the second DC/DC converter such that DC voltage on the power feed line attains a reference voltage in the power failure.

19 Claims, 17 Drawing Sheets

POWER FEEDING DEVICE AND POWER FEEDING SYSTEM INCLUDING THE SAME

BACKGROUND OF THE INVENTION

Field of the Invention

The present disclosure relates to a power feeding device, and particularly to a power feeding device that supplies power from a power source, a solar battery, and a power storage device to a load and a power feeding system including the same.

Description of the Background Art

For example, Japanese Patent Laying-Open No. 2015-164373 discloses a power feeding device including a power feed line for supplying DC power to a load, a DC power source provided between a commercial AC power source and the power feed line, a first power converter provided between a solar battery and the power feed line, and a second power converter provided between a power storage device and the power feed line.

In a normal state of the commercial AC power source, DC power is supplied from the DC power source to the power feed line, DC power is supplied from the solar battery to the power feed line through the first power converter, DC power is supplied from the power feed line to the power storage device through the second power converter, and the load is operated and the power storage device is charged.

When a power failure of the commercial AC power source occurs, the operation of the DC power source and the first power converter is stopped, DC power is supplied from the power storage device to the power feed line through the second power converter, and the power storage device is discharged and the load is operated. When DC power of the power storage device becomes lower than a lower limit, the operation of the second power converter is stopped and DC power is supplied from the solar battery to the power feed line through the first power converter.

SUMMARY OF THE INVENTION

Unfortunately, in the power feeding device in Japanese Patent Laying-Open No. 2015-164373, the load is unable to operate when the amount of power generation by the solar battery is smaller than load power due to weak solar light after the power storage device is discharged during the power failure of the commercial AC power source. The use efficiency of the solar battery in a power failure is therefore low.

A main object of the present disclosure is to provide a power feeding device with high use efficiency of a solar battery in a power failure and a power feeding system including the same.

A power feeding device according to an aspect of the present disclosure includes: a power feed line that supplies power from a power source to a load; a first power converter that supplies power generated by a solar battery to the power feed line; at least one second power converter that provides and receives power between at least one power storage device and the power feed line; a first controller that controls the first power converter in a normal state of the power source such that output of the solar battery is maximized, and controls the first power converter in a power failure of the power source such that the solar battery outputs a first power smaller than a load power; and at least one second controller that controls the at least one second power converter in the normal state of the power source such that a terminal-to-terminal voltage of the at least one power storage device attains a first reference voltage, and controls the second power converter in the power failure of the power source such that a voltage on the power feed line attains a second reference voltage.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
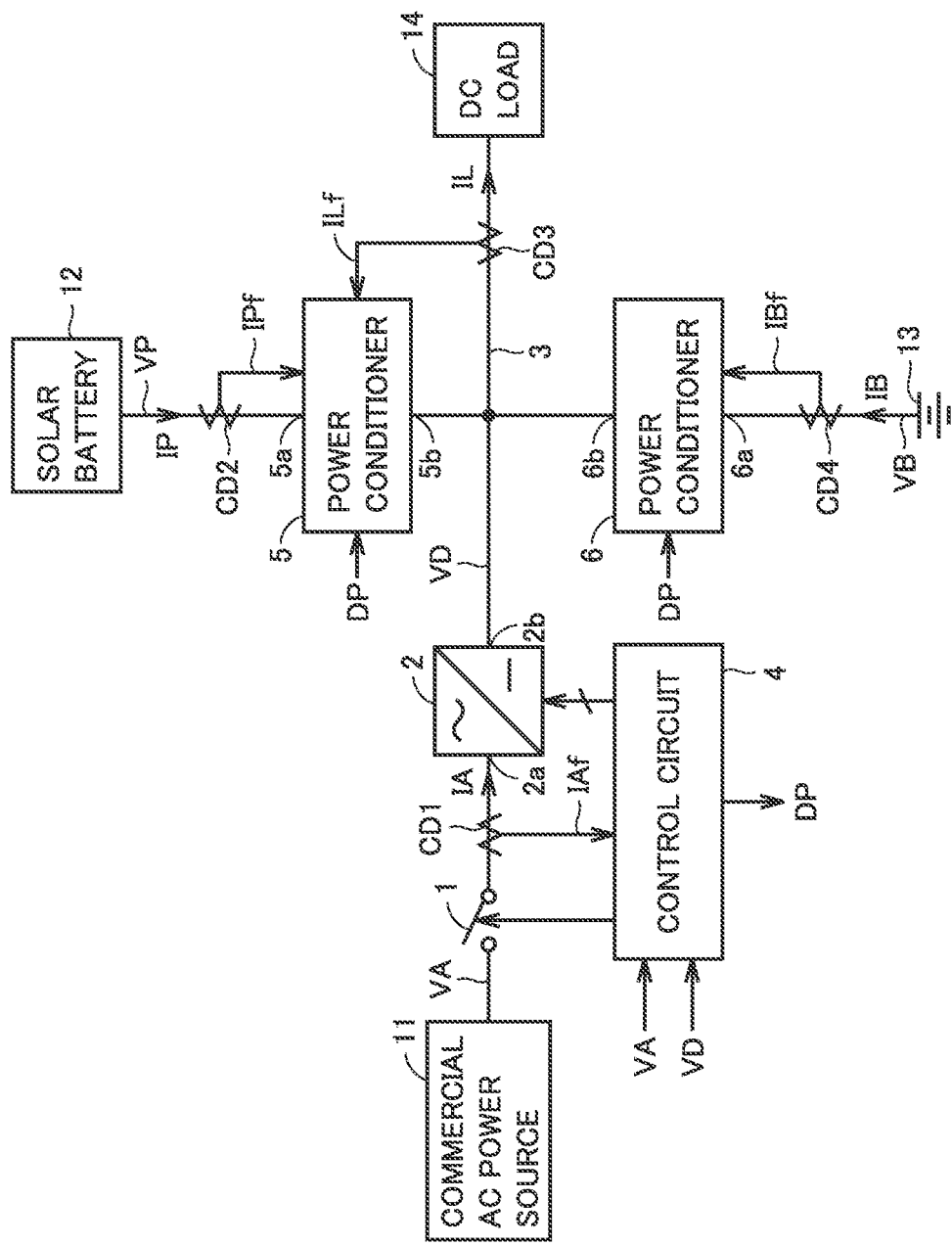
FIG. 1 is a circuit block diagram showing a configuration of a DC power feeding device according to a first embodiment.

FIG. 1 is a circuit block diagram showing a configuration of a DC power feeding device according to a first embodiment. In FIG. 1, this DC power feeding device includes a switch 1, current detectors CD1 to CD4, an AC/DC converter 2, a power feed line 3, a control circuit 4, and power conditioners 5 and 6, and receives power from a commercial AC power source 11, a solar battery 12, and a battery 13 to supply DC power to a DC load 14. The DC power feeding device, solar battery 12, and battery 13 constitute an embodiment of the power feeding system.

Switch 1 has one terminal receiving AC voltage VA supplied from commercial AC power source 11 and the other terminal connected to an AC terminal 2a of AC/DC converter 2. A DC terminal 2b of AC/DC converter 2 is connected to DC load 14 through power feed line 3.

The on and off of switch 1 is controlled by control circuit 4. When AC voltage VA is supplied normally from commercial AC power source 11 (in a normal state of commercial AC power source 11), switch 1 is turned on. When AC voltage VA is not supplied normally from commercial AC power source 11 (in a power failure of commercial AC power source 11), switch 1 is turned off.

AC/DC converter 2 is controlled by control circuit 4, provides and receives power between commercial AC power source 11 and power feed line 3 in a normal state of commercial AC power source 11, and stops its operation in a power failure of commercial AC power source 11. Current detector CD1 detects AC current IA flowing between switch 1 and AC terminal 2a of AC/DC converter 2 and outputs a signal IAf indicating the detection value to control circuit 4.

Control circuit 4 controls switch 1 and AC/DC converter 2, based on AC voltage VA supplied from commercial AC power source 11, DC voltage VD on power feed line 3, and output signal IAf of current detector CD1, and generates and outputs a power failure detection signal DP to power conditioners 5 and 6.

Figure 2:
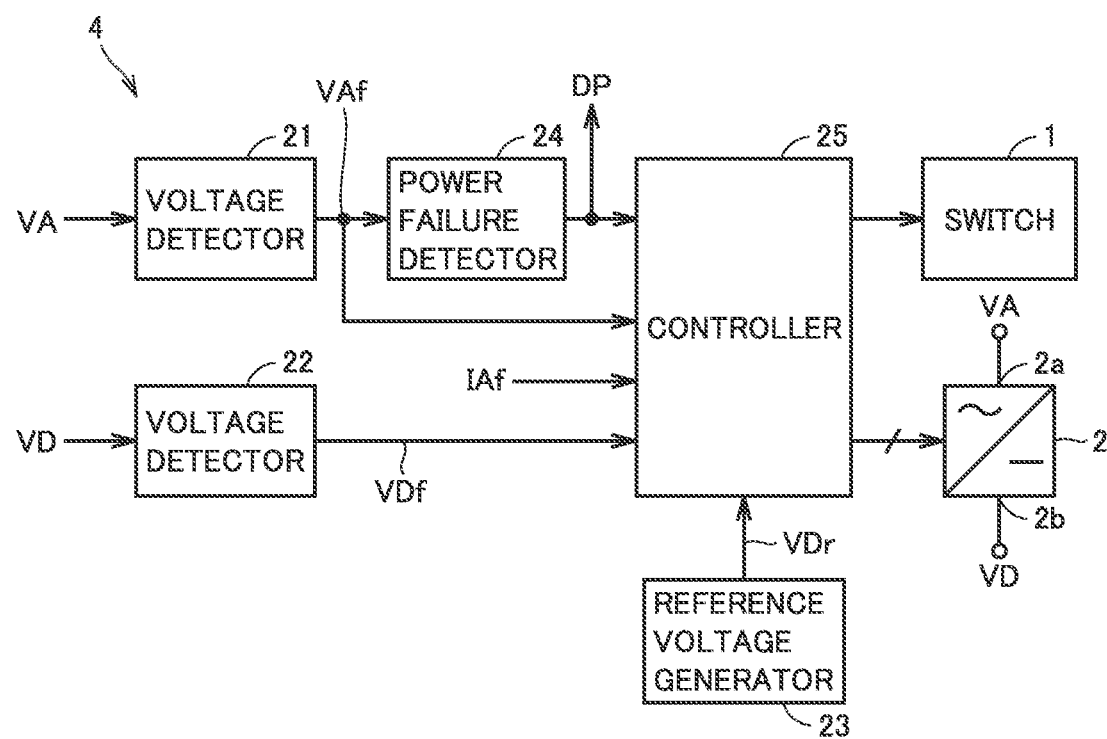
FIG. 2 is a block diagram showing a configuration of a control circuit shown in FIG. 1.

FIG. 2 is a block diagram showing a configuration of control circuit 4. In FIG. 2, control circuit 4 includes voltage detectors 21 and 22, a reference voltage generator 23, a power failure detector 24, and a controller 25. Voltage detector 21 detects an instantaneous value of AC voltage VA supplied from commercial AC power source 11 and outputs a signal VAf indicating the detection value to power failure detector 24 and controller 25. Voltage detector 22 detects DC voltage VD on power feed line 3 and outputs a signal VDf indicating the detection value to controller 25. Reference voltage generator 23 generates and outputs a reference voltage VDr to controller 25.

Power failure detector 24 determines whether AC voltage VA is supplied normally from commercial AC power source 11, based on output signal VAf of voltage detector 21, and outputs a power failure detection signal DP indicating the determination result to controller 25 and power conditioners 5 and 6. For example, power failure detector 24 determines that AC voltage VA is supplied normally when AC voltage VA falls within a normal range and determines that AC voltage VA is not supplied normally when AC voltage VA falls outside the normal range.

When AC power is supplied normally from commercial AC power source 11 (in a normal state of commercial AC power source 11), power failure detection signal DP is set to "H" level that is the inactive level. When AC power is not supplied normally from commercial AC power source 11 (in a power failure of commercial AC power source 11), power failure detection signal DP is set to "L" level that is the active level.

When power failure detection signal DP is at "H" level (in a normal state of commercial AC power source 11), controller 25 (third controller) turns on switch 1 and controls AC/DC converter 2 such that DC voltage VD on power feed line 3 attains reference voltage VDr (for example 380 V), based on output signals VAf and VDf of voltage detectors 21 and 22, output signal IAf of current detector CD1, and reference voltage VDr from reference voltage generator 23. When power failure detection signal DP is at "L" level (in a power failure of commercial AC power source 11), controller 25 turns off switch 1 and stops the operation of AC/DC converter 2.

Referring to FIG. 1 again, solar battery 12 receives solar light and outputs DC power. Power conditioner 5 has an input terminal 5a receiving DC output voltage VP from solar battery 12 and has an output terminal 5b connected to power feed line 3. Current detector CD2 detects DC output current IP of solar battery 12 and outputs a signal IPf indicating the detection value to power conditioner 5. Current detector CD3 detects DC current IL (load current) flowing from power feed line 3 to DC load 14 and outputs a signal indicating the detection value to power conditioner 5.

Power conditioner 5 controls DC power supplied from solar battery 12 to power feed line 3, based on power failure detection signal DP, DC output voltage VP of solar battery 12, and output signals IPf and ILf of current detectors CD2 and CD3.

Figure 3:
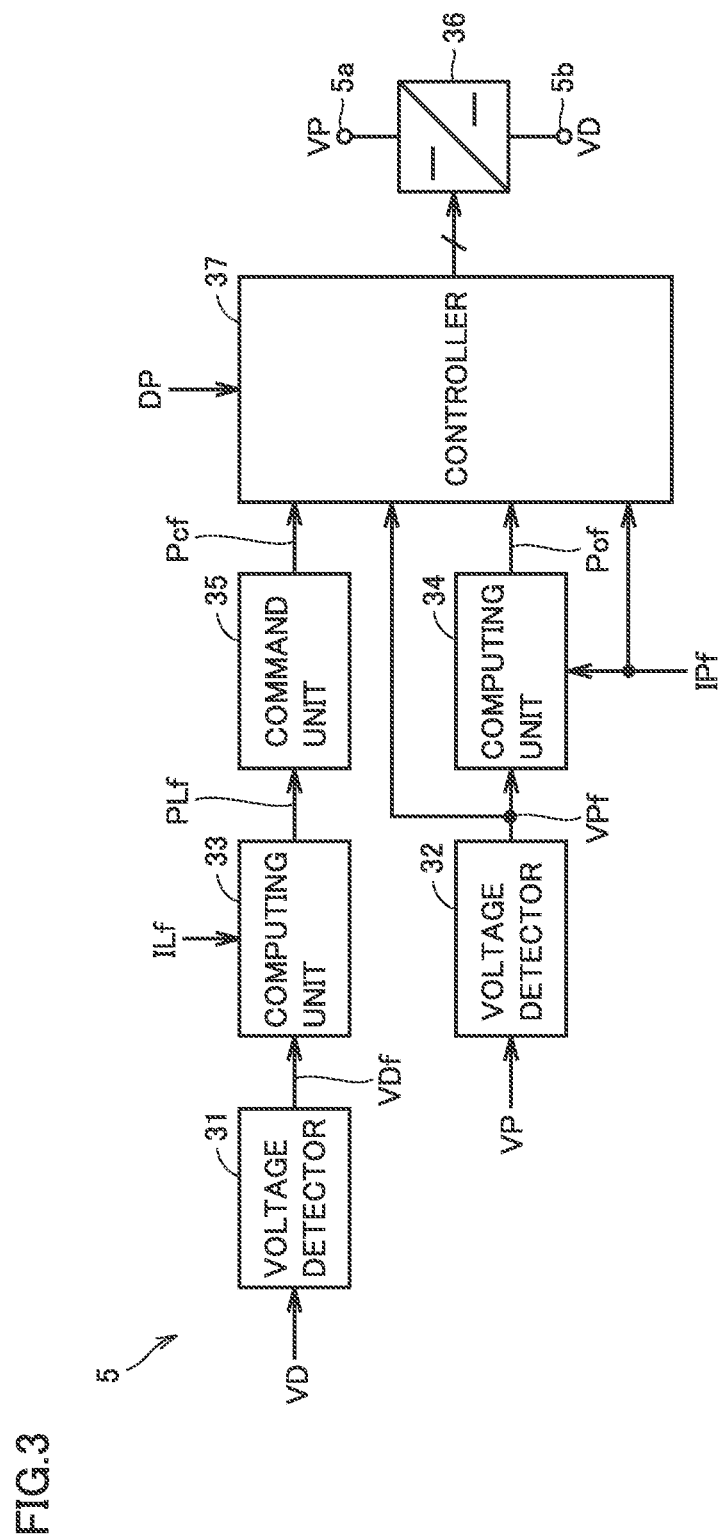
FIG. 3 is a block diagram showing a configuration of a power conditioner 5 shown in FIG. 1.

FIG. 3 is a block diagram showing a configuration of power conditioner 5. In FIG. 3, power conditioner 5 includes voltage detectors 31 and 32, computing units 33 and 34, a command unit 35, a DC/DC converter 36, and a controller 37.

Voltage detector 31 detects DC voltage VD on power feed line 3 and outputs a signal VDf indicating the detection value to computing unit 33. Voltage detector 32 detects DC output voltage VP of solar battery 12 and outputs a signal VPf indicating the detection value to computing unit 34 and controller 37.

Computing unit 33 determines a power consumption PL of DC load $14=VD \times IL$, based on DC voltage VD on power feed line 3 indicated by output signal VDf of voltage detector 31 and load current IL indicated by output signal ILf of current detector CD3 and outputs a signal PLf indicating the determined load power PL to command unit 35. Voltage detector 31 may be removed, and output signal VDf of voltage detector 22 (FIG. 2) may be supplied to computing unit 33.

Computing unit 34 determines a DC output power Po of solar battery $12=VP \times IP$, based on DC output voltage VP of solar battery 12 indicated by output signal VPf of voltage detector 32 and DC output current IP of solar battery 12 indicated by output signal IPf of current detector CD2, and outputs a signal Pof indicating the determined DC output power Po to controller 37.

Command unit 35 determines a power generation amount command value Pc=PL−Pa, which is smaller than load power PL indicated by output signal PLf of computing unit 33 by a predetermined power Pa (for example 1 kW), and outputs a signal Pcf indicating the determined power generation amount command value Pc to controller 37.

DC/DC converter 36 (first power converter) is connected between input terminal 5a and output terminal 5b (FIG. 1) and controlled by controller 37 and steps up (or steps down) DC output voltage VP of solar battery 12 for output to power feed line 3.

When power failure detection signal DP is at "H" level (in a normal state of commercial AC power source 11), controller 37 (first controller) performs maximum power tracking control of solar battery 12. Specifically, controller 37 controls DC/DC converter 36 such that DC output power Po of solar battery 12 is maximized (Po=Pmax), based on DC output voltage VP, DC output current IP, and DC output power Po of solar battery 12.

On the other hand, when power failure detection signal DP is at "L" level (in a power failure of commercial AC power source 11), controller 37 controls DC/DC converter 36 such that DC output power Po of solar battery 12 attains a smaller one of the power generation amount command value Pc or the amount of power generation Pmax determined by maximum power tracking control, based on the power generation amount command value Pc, and DC output voltage VP, DC output current IP, and DC output power Po of solar battery 12.

Referring to FIG. 1 again, power conditioner 6 has an input terminal 6a connected to battery 13 and an output terminal 6b connected to power feed line 3. Battery 13 (power storage device) stores DC power. Battery 13 is, for example, a lithium ion battery. A capacitor may be connected instead of battery 13. Current detector CD4 detects DC current IB flowing between battery 13 and input terminal 6a and outputs a signal IBf indicating the detection value to power conditioner 6.

Power conditioner 6 provides and receives DC power between power feed line 3 and battery 13, based on power failure detection signal DP, terminal-to-terminal voltage VB of battery 13, output signal IBf of current detector CD4, and DC voltage VD on power feed line 3.

Figure 4:
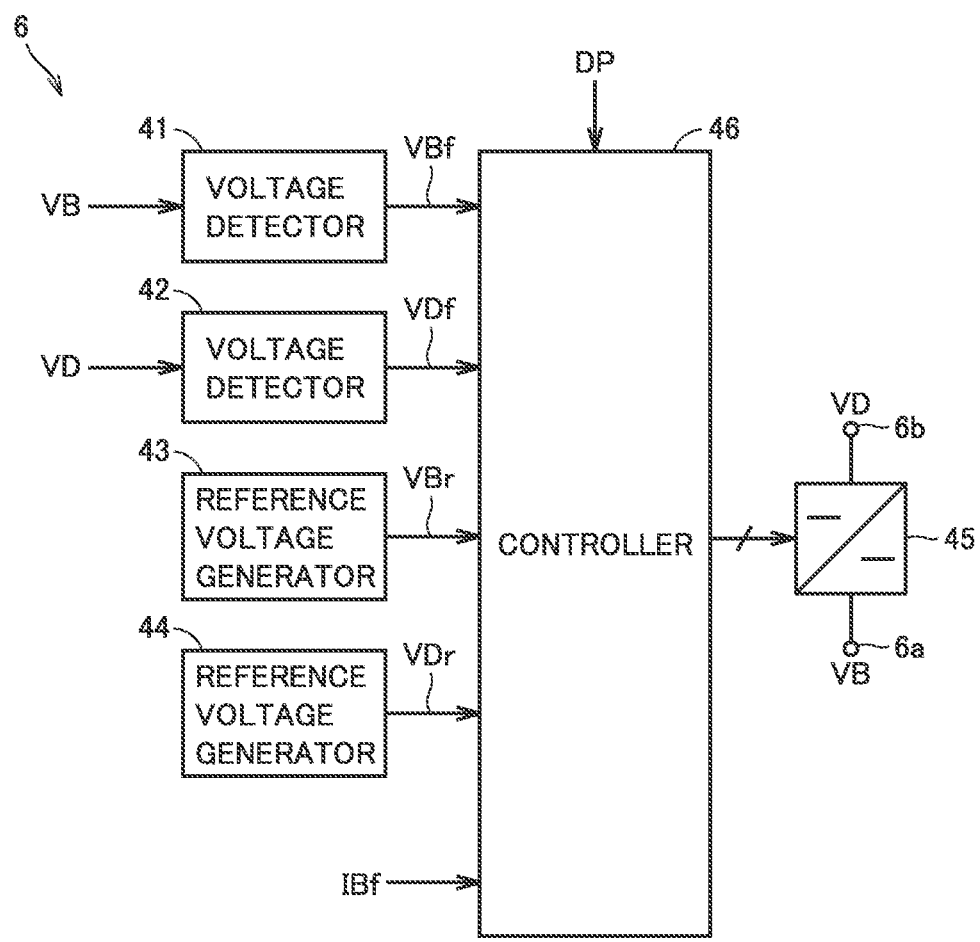
FIG. 4 is a block diagram showing a configuration of a power conditioner 6 shown in FIG. 1.

FIG. 4 is a block diagram showing a configuration of power conditioner 6. In FIG. 4, power conditioner 6 includes voltage detectors 41 and 42, reference voltage generators 43 and 44, a DC/DC converter 45, and a controller 46.

Voltage detector 41 detects terminal-to-terminal voltage VB of battery 13 and outputs a signal VBf indicating the detection value to controller 46. Voltage detector 42 detects DC voltage VD on power feed line 3 and outputs a signal VDf indicating the detection value to controller 46. Voltage detector 42 may be removed, and output signal VDf of voltage detector 22 (FIG. 2) or voltage detector 31 (FIG. 3) may be supplied to controller 46.

Reference voltage generator 43 outputs reference voltage VBr to controller 46. Reference voltage generator 44 outputs reference voltage VDr to controller 46. Reference voltage generator 44 may be removed, and output voltage VDr of reference voltage generator 23 (FIG. 2) may be supplied to controller 46.

DC/DC converter 45 (second power converter) is connected between input terminal 6a and output terminal 6b (FIG. 1) and controlled by controller 46, and provides and receives DC power between power feed line 3 and battery 13.

When power failure detection signal DP is at "H" level (in a normal state of commercial AC power source 11), controller 46 (second controller) controls DC/DC converter 45 such that battery voltage VB attains reference voltage VBr, based on battery voltage VB, DC voltage VD on power feed line 3, and battery current IB indicated by output signals VBf and VDf of voltage detectors 41 and 42 and output signal IBf of current detector CD4, and reference voltage VBr.

DC/DC converter 45 and AC/DC converter 2 may be controlled so that power is provided and received between battery 13 and commercial AC power source 11 (power system) and peak-cut and peak-shift of power consumption in the power system are performed.

On the other hand, when power failure detection signal DP is at "L" level (in a power failure of commercial AC power source 11), controller 46 controls DC/DC converter 45 such that DC voltage VD on power feed line 3 attains reference voltage VDr, based on battery voltage VB, DC voltage VD on power feed line 3, and battery current IB indicated by output signals VBf and VDf of voltage detectors 41 and 42 and output signal IBf of current detector CD4, and reference voltage VDr.

The operation of this DC power feeding device will now be described. In a normal state of commercial AC power source 11, power failure detector 24 (FIG. 2) of control circuit 4 sets power failure detection signal DP to "H" level that is the inactive level.

When power failure detection signal DP is set to "H" level, controller 25 (FIG. 2) turns on switch 1, and commercial AC power source 11 is connected to AC/DC converter 2 through switch 1. Controller 25 controls AC/DC converter 2 such that DC voltage VD on power feed line 3 attains reference voltage VDr.

Furthermore, when power failure detection signal DP is set to "H" level, controller 37 (FIG. 3) of power conditioner 5 performs maximum power tracking control of solar battery 12, and DC power generated by solar battery 12 is supplied to power feed line 3 through DC/DC converter 36 (FIG. 3). Furthermore, computing unit 33 (FIG. 3) determines a load power PL=VD×IL, and command unit 35 (FIG. 3) generates a power generation amount command value Pc=PL−Pa, which is smaller than load power PL by a predetermined power Pa.

Furthermore, when power failure detection signal DP is set to "H" level, DC power on power feed line 3 is supplied to battery 13 through DC/DC converter 45 (FIG. 4) of power conditioner 6 to charge battery 13. Controller 46 (FIG. 4) controls DC/DC converter 45 such that battery voltage VB attains reference voltage VBr.

When the amount of power generation by solar battery 12 is smaller than load power PL, a shortage of power is supplied from commercial AC power source 11 to power feed line 3 through AC/DC converter 2, and DC voltage VD on power feed line 3 is maintained at reference voltage VDr. Conversely, when the amount of power generation by solar battery 12 is larger than load power PL, an excess of power is supplied from power feed line 3 to commercial AC power source 11 through AC/DC converter 2, and DC voltage VD on power feed line 3 is maintained at reference voltage VDr. DC load 14 is driven by DC power from power feed line 3.

When a power failure of commercial AC power source 11 occurs, power failure detector 24 (FIG. 2) of control circuit 4 sets power failure detection signal DP to "L" level that is the active level. When power failure detection signal DP is set to "L" level, controller 25 turns off switch 1, and commercial AC power source 11 is cut off from AC/DC converter 2. Controller 25 (FIG. 2) stops the operation of AC/DC converter 2. Thus, outflow of power from power feed line 3 to commercial AC power source 11 through AC/DC converter 2 and switch 1 is prevented.

Furthermore, when power failure detection signal DP is set to "L" level, controller 37 (FIG. 3) of power conditioner 5 controls DC/DC converter 36 such that the amount of power generation Po by solar battery 12 attains a smaller one of the power generation amount command value Pc=PL−Pa or the amount of power generation Pmax determined by maximum power tracking control. At this time, the amount of power generation Po by solar battery 12 is smaller than load power PL, but the shortage of power is filled by battery 13.

Specifically, when power failure detection signal DP is set to "L" level, DC power of battery 13 is supplied to power feed line 3 through DC/DC converter 45 (FIG. 4) of power conditioner 6. Controller 46 (FIG. 4) controls DC/DC converter 45 such that DC voltage VD on power feed line 3 attains reference voltage VDr. Therefore, even when a power failure of commercial AC power source 11 occurs, the operation of DC load 14 can be continued in a period in which DC power is left in battery 13.

As described above, in this first embodiment, in a power failure of commercial AC power source 11, DC/DC converter 36 is controlled such that solar battery 12 outputs DC power Pc smaller than load power PL, and DC/DC converter 45 is controlled such that DC voltage VD on power feed line 3 attains reference voltage VDr. Therefore, even when the amount of power generation by solar battery 12 is smaller than load power PL due to weak solar light, DC power generated by solar battery 12 can be used, and the use efficiency of solar battery 12 in a power failure can be enhanced.

Second Embodiment

In the first embodiment, in a case where switching of the power generation amount command value Pc in controller 37 is delayed due to delay in providing and receiving of power failure detection signal DP between control circuit 4 and power conditioner 5, if a power failure of commercial AC power source 11 occurs when the amount of power generation Po by solar battery 12 is larger than load power PL, the amount of power supply to power feed line 3 becomes excessive and DC voltage VD on power feed line 3 becomes excessive, possibly causing breakage of the DC power feeding device and DC load 14. In this second embodiment, this problem is to be solved.

Figure 5:
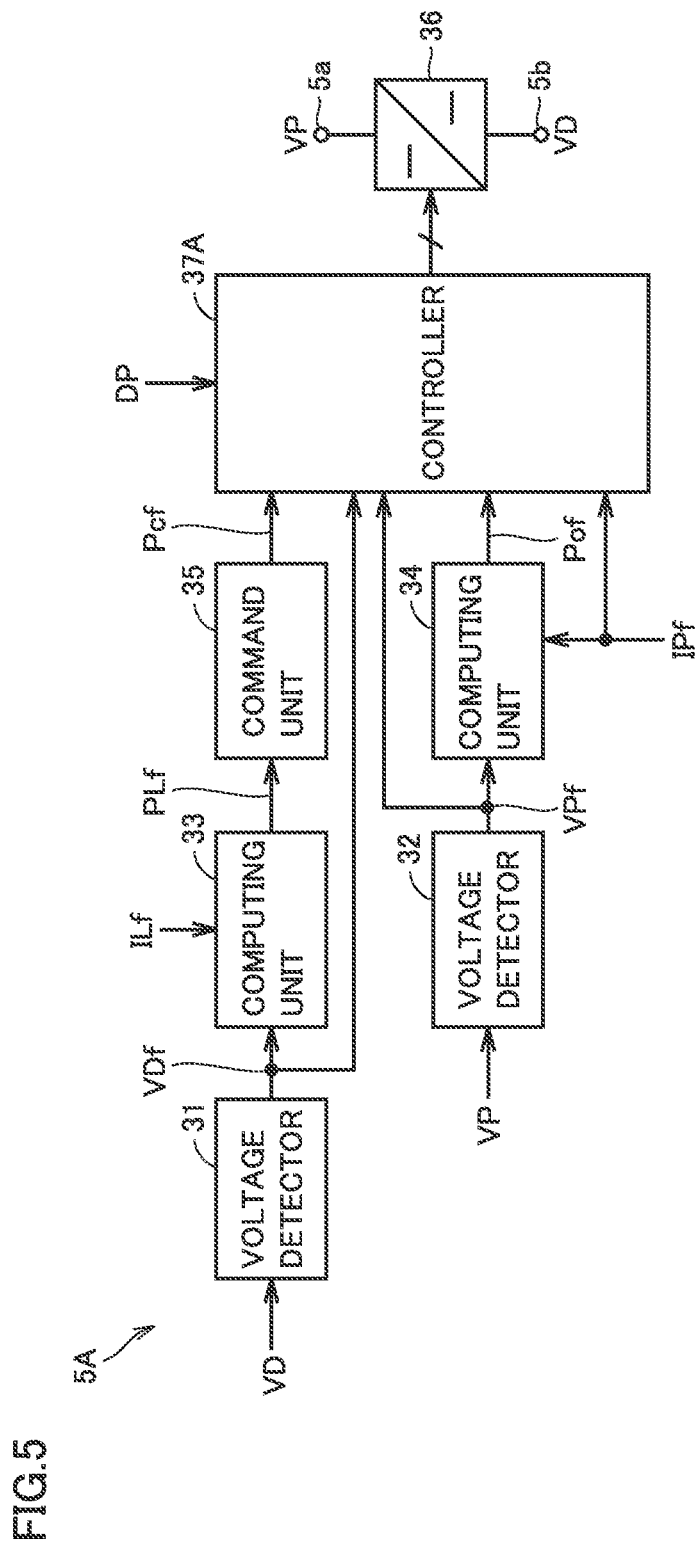
FIG. 5 is a block diagram showing a main part of a DC power feeding device according to a second embodiment.

FIG. 5 is a block diagram showing a main part of a DC power feeding device according to the second embodiment, in comparison with FIG. 3. Referring to FIG. 5, this DC power feeding device differs from the DC power feeding device in the first embodiment in that power condition 5 is replaced by a power conditioner 5A. In power conditioner 5A, controller 37 of power conditioner 5 is replaced by controller 37A.

Controller 37A performs the same operation as controller 37 and, in addition, monitors DC voltage VD on power feed line 3 indicated by output signal VDf of voltage detector 31 and reduces the amount of power generation by solar battery 12 by a predetermined power when DC voltage VD becomes higher than an upper limit voltage VDH (for example, 380+10=390 V). The other configuration and operation is the same as that of the first embodiment and a description thereof will not be repeated.

As described above, in this second embodiment, the same effect as in the first embodiment is achieved. In addition, when DC voltage VD becomes higher than upper limit voltage VDH, the amount of power generation by solar battery 12 is reduced, so that DC voltage VD on power feed line 3 can be prevented from becoming excessive even when switching of the power generation amount command value in controller 37A is delayed, and the operation in a normal state of commercial AC power source 11 can stably shift to the operation in a power failure.

Third Embodiment

Figure 6:
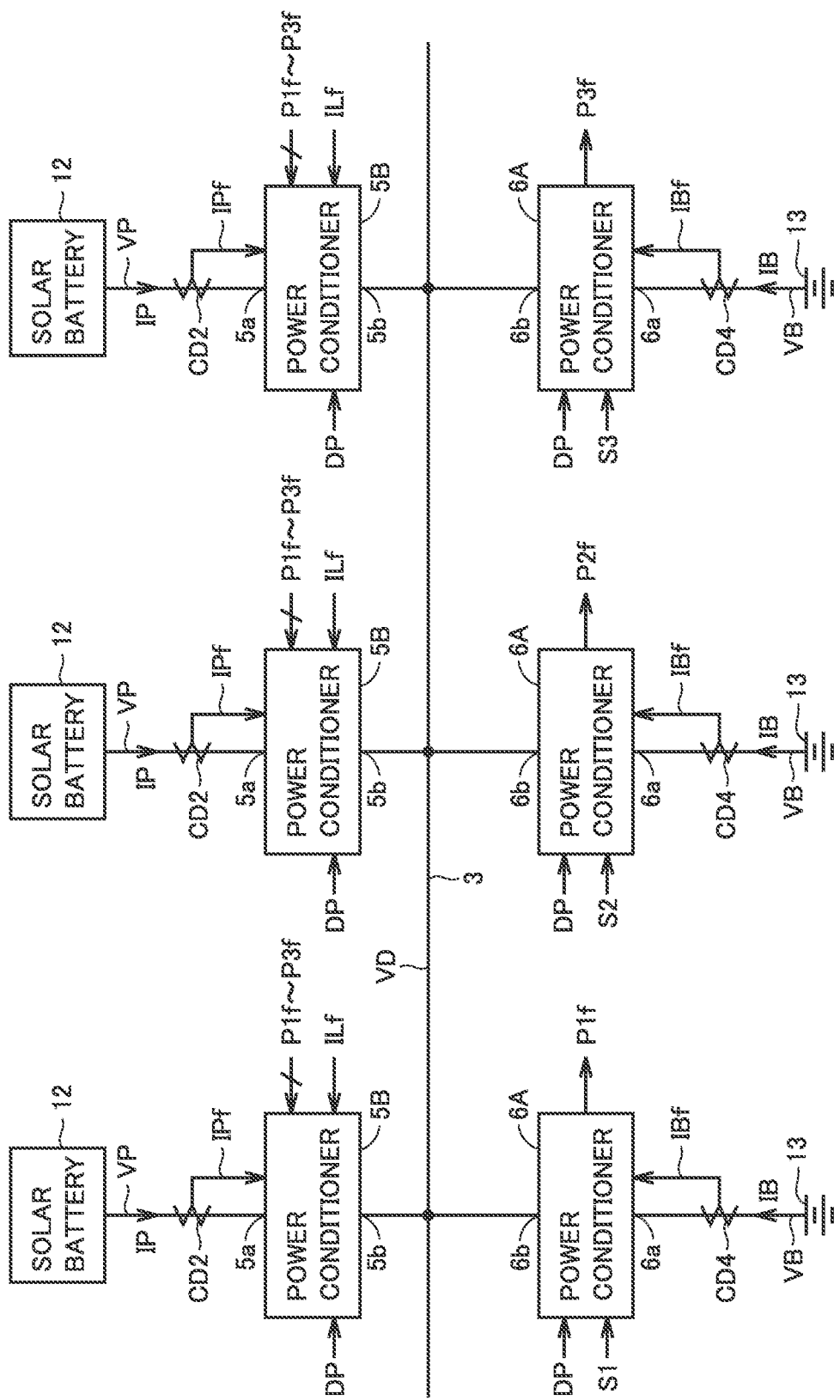
FIG. 6 is a circuit block diagram showing a main part of a DC power feeding device according to a third embodiment.

FIG. 6 is a block diagram showing a main part of a DC power feeding device according to a third embodiment, in comparison with FIG. 1. Referring to FIG. 6, this DC power feeding device differs from the DC power feeding device in the first embodiment in that N sets of power conditioner 6A and current detector CD4 corresponding to N batteries 13 and M sets of power conditioner 5A and current detector CD2 corresponding to M solar batteries 12 are provided.

Here, N is an integer equal to or greater than two, M is a natural number, and N=M=3 in the present third embodiment.

When power failure detection signal DP is at "H" level (in a normal state of commercial AC power source 11), each power conditioner 6A operates in the same manner as power conditioner 6 and charges the corresponding battery 13 such that terminal-to-terminal voltage VB of the corresponding battery 13 attains reference voltage VBr.

Select signals S1 to S3 are respectively applied to three power conditioners 6A. When power failure detection signal DP is at "L" level (in a power failure of commercial AC power source 11), select signals S1 to S3 are set to "H" level successively for a predetermined time. Each power conditioner 6A discharges the corresponding battery 13 such that DC voltage VD on power feed line 3 attains reference voltage VDr when the corresponding select signal is set to "H" level.

Each power conditioner 6A charges the corresponding battery 13 such that terminal-to-terminal voltage VB of the corresponding battery 13 attains reference voltage VBr when the corresponding select signal is set to "L" level.

Figure 7:
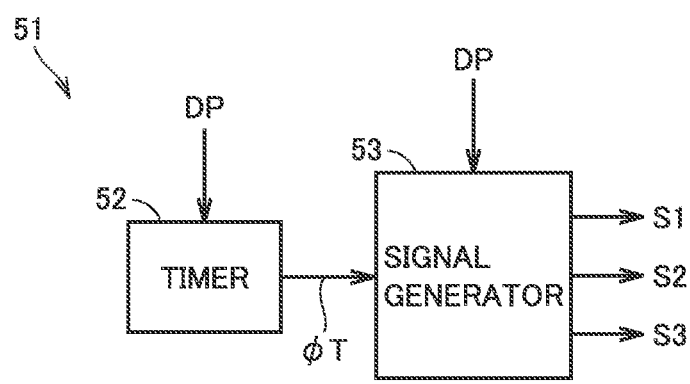
FIG. 7 is a block diagram showing a configuration of a select signal generator to generate select signals shown in FIG. 6.

FIG. 7 is a block diagram showing a configuration of a selector 51 that generates select signals S1 to S3. Selector 51 is included, for example, in control circuit 4 (FIG. 1). In FIG. 7, selector 51 includes a timer 52 and a signal generator 53. Timer 52 is set in response to occurrence of a power failure of commercial AC power source 11 and power failure detection signal DP being lowered from "H" level to "L" level, measures the time passed since occurrence of the power failure, and outputs a signal φT indicating the measured time.

Timer 52 is reset in response to power recovery of commercial AC power source 11 and power failure detection signal DP rising from "L" level to "H" level, and the measured time is reset to zero.

When power failure detection signal DP is at "H" level (in a normal state of commercial AC power source 11), signal generator 53 maintains each of select signals S1 to S3 at "L" level. On the other hand, when power failure detection signal DP is at "L" level (in a power failure of commercial AC power source 11), signal generator 53 operates based on output signal φT from timer 52 and sets select signals S1 to S3 to "H" level successively for a predetermined time.

Specifically, signal generator 53 stores the select signal previously set to "H" level (for example S2). In response to power failure detection signal DP being set to "L" level, signal generator 53 raises the select signal (in this case S3) subsequent to the select signal previously set to "H" level (in this case S2) to "H" level. When a predetermined time has passed, signal generator 53 lowers the select signal previously set to "H" level (in this case S3) to "L" level and the subsequent select signal (in this case S1) to "H" level. When a predetermined time has further passed, signal generator 53 lowers the select signal previously set to "H" level (in this case S1) to "L" level and raises the subsequent select signal (in this case S2) to "H" level. Subsequently, signal generator 53 sets select signals S1 to S3 to "H" level successively for a predetermined time, similarly.

Figure 8:
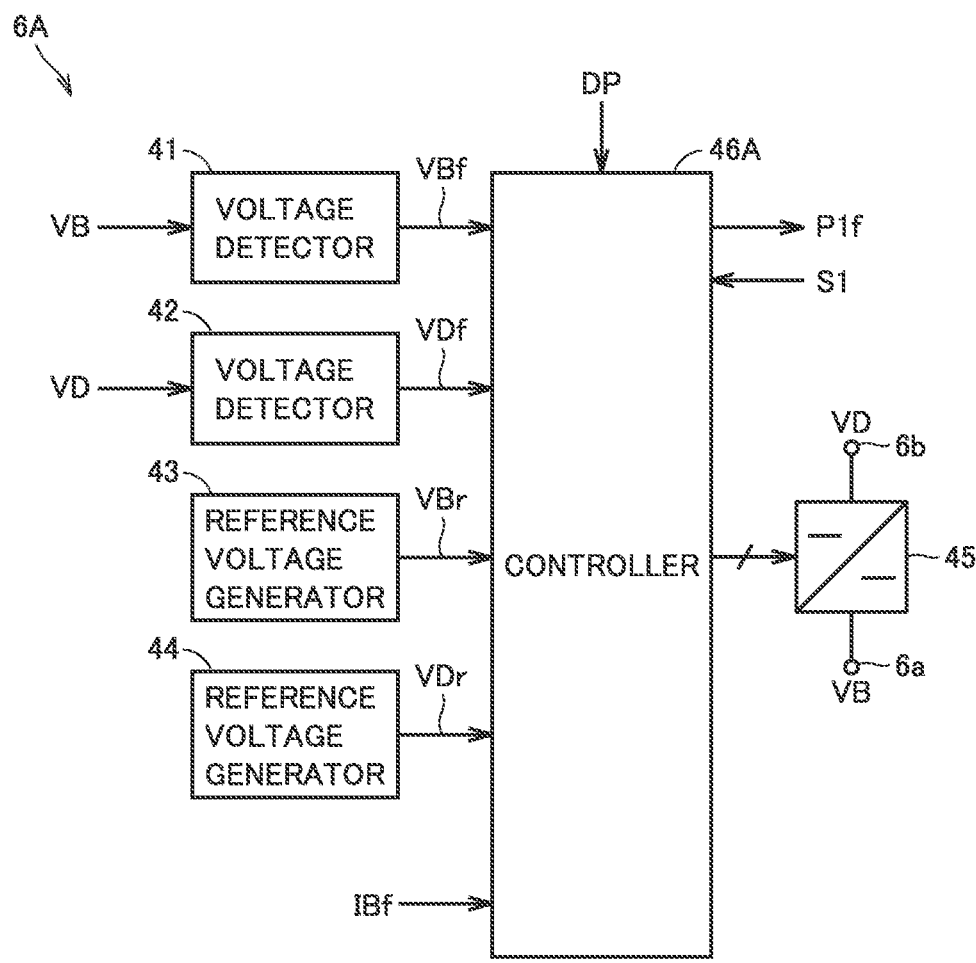
FIG. 8 is a block diagram showing a configuration of a power conditioner 6A shown in FIG. 6.

FIG. 8 is a block diagram showing a configuration of power conditioner 6A, in comparison with FIG. 4. Referring to FIG. 8, in power conditioner 6A, controller 46 of power conditioner 6 is replaced by controller 46A. In FIG. 8, among three power conditioners 6A, power conditioner 6A that receives select signal S1 is shown.

In a case where power failure detection signal DP is at "H" level (in a normal state of commercial AC power source 11) and when select signal S1 is at "L" level in a case where power failure detection signal DP is at "L" level (in a power failure of commercial AC power source 11), controller 46A controls DC/DC converter 45 such that battery voltage VB attains reference voltage VBr, based on battery voltage VB, DC voltage VD on power feed line 3, and battery current IB indicated by output signals VBf and VDf of voltage detectors 41 and 42 and output signal IBf of current detector CD4, and reference voltage VBr.

At this time, controller 46A determines a power P1 supplied to the corresponding battery 13, based on battery voltage VB and battery current IB indicated by output signal VBf of voltage detector 41 and output signal IBf of current detector CD4, and outputs a signal P1f indicating the determined value.

When select signal S1 is at "H" level in a case where power failure detection signal DP is at "L" level (in a power failure of commercial AC power source 11), controller 46A controls DC/DC converter 45 such that DC voltage VD on power feed line 3 attains reference voltage VDr, based on battery voltage VB, DC voltage VD on power feed line 3, and battery current IB indicated by output signals VBf and VDf of voltage detectors 41 and 42 and output signal IBf of current detector CD4, and reference voltage VDr. At this time, controller 46A outputs signal P1f=0 indicating that power P1 supplied to battery 13 is zero.

Power conditioners 6A receiving select signals S2 and S3 have a configuration similar to that of power conditioner 6A receiving select signal S1 and respectively output signals P2f and P3f, instead of signal P1f.

Figure 9:
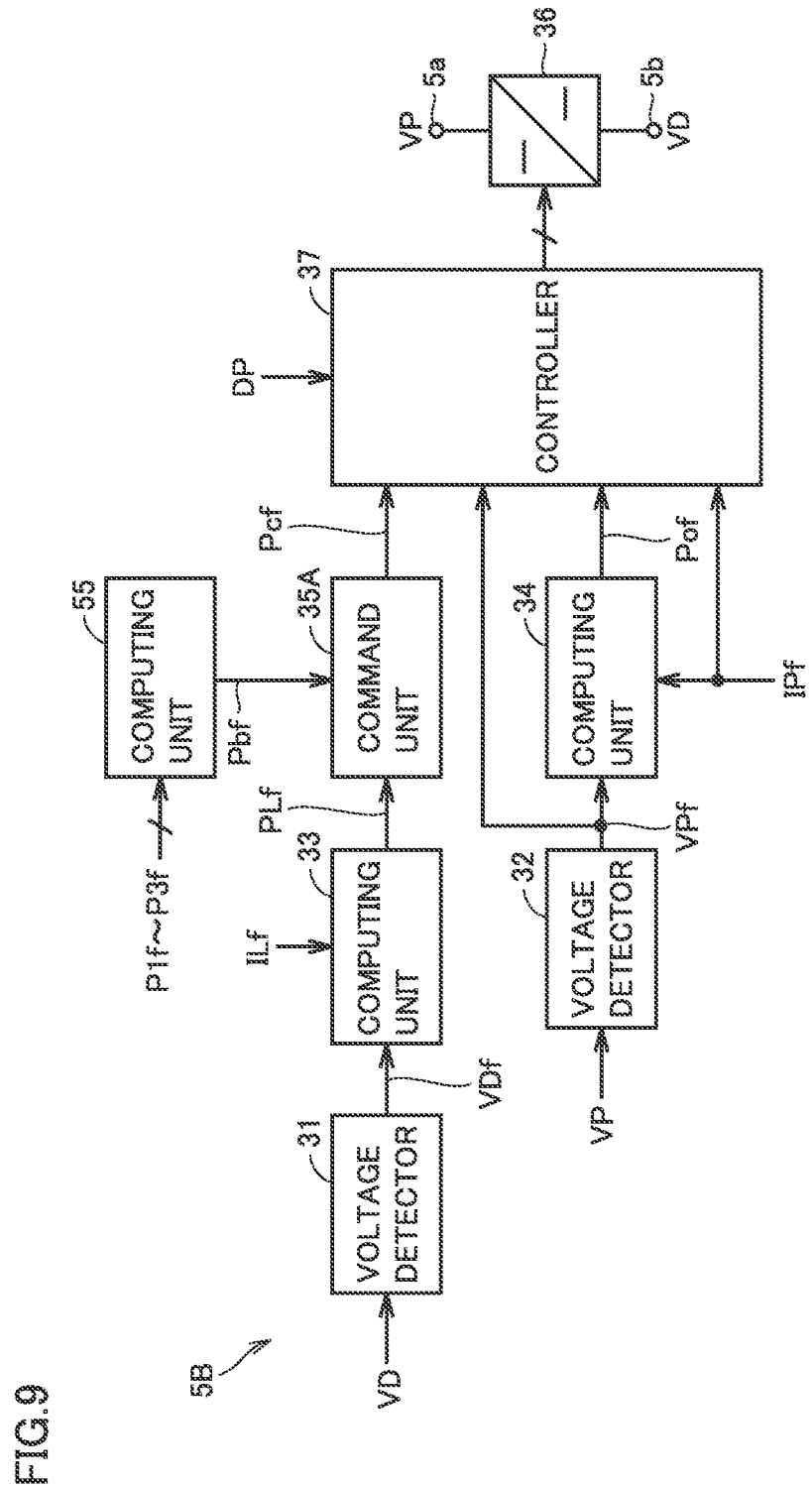
FIG. 9 is a block diagram showing a configuration of a power conditioner 5A shown in FIG. 6.

Referring to FIG. 6 again, each power conditioner 5A controls DC power supplied from the corresponding solar battery 12 to power feed line 3, based on power failure detection signal DP, DC output voltage VP of the corresponding of solar battery 12, output signal IPf of the corresponding current detector CD2, output signal ILf of current detector CD3, and output signals P1f to P3f of three power conditioners 6A. FIG. 9 is a block diagram showing a configuration of a power conditioner 5B, in comparison with FIG. 3. Referring to FIG. 9, in power conditioner 5B, a computing unit 55 is added to power conditioner 5 and command unit 35 is replaced by a command unit 35A.

Computing unit 55 determines a power Pb=P1+P2+P3 necessary for charging two batteries 13 among three batteries 13 in a power failure of commercial AC power source 11 by adding up powers P1 to P3 indicated by signals P1f to P3f and outputs a signal Pbf indicating the determined power Pb to command unit 35A.

Command unit 35A determines a power generation amount command value Pc=(PL−Pa+Pb)/3 by dividing a power smaller than load power PL indicated by output signal PLf of computing unit 33 by a predetermined power Pa (for example 1 kW) and larger by power Pb indicated by output signal Pbf of computing unit 55, by the number of solar batteries 12 (in this case three), and outputs a signal Pcf indicating the determined power generation amount command value Pc to controller 37.

When power failure detection signal DP is at "H" level (in a normal state of commercial AC power source 11), controller 37 performs maximum power tracking control of solar battery 12. Specifically, controller 37 controls DC/DC converter 36 such that DC output power Po of solar battery 12 is maximized (Po=Pmax), based on DC output voltage VP, DC output current IP, and DC output power Po of solar battery 12.

On the other hand, when power failure detection signal DP is at "L" level (in a power failure of commercial AC power source 11), controller 37 controls DC/DC converter 36 such that DC output power Po of solar battery 12 attains a smaller one of the power generation amount command value Pc or the amount of power generation Pmax determined by maximum power tracking control, based on the power generation amount command value Pc, and DC output voltage VP, DC output current IP, and DC output power Po of solar battery 12.

The operation of this DC power feeding device will now be described. In a normal state of commercial AC power source 11, power failure detector 24 (FIG. 2) of control circuit 4 sets power failure detection signal DP to "H" level that is the inactive level.

When power failure detection signal DP is set to "H" level, controller 25 (FIG. 2) turns on switch 1, and commercial AC power source 11 is connected to AC/DC converter 2 through switch 1. Controller 25 controls AC/DC converter 2 such that DC voltage VD on power feed line 3 attains reference voltage VDr.

Furthermore, when power failure detection signal DP is set to "H" level, controller 37 (FIG. 3, FIG. 9) of each power conditioner 5B performs maximum power tracking control of solar battery 12, and DC power generated by solar battery 12 is supplied to power feed line 3 through DC/DC converter 36 (FIG. 3, FIG. 9).

Furthermore, when power failure detection signal DP is set to "H" level, DC power on power feed line 3 is supplied to battery 13 through DC/DC converter 45 (FIG. 4, FIG. 8) of each power conditioner 6A to charge each battery 13. Controller 46A (FIG. 8) controls DC/DC converter 45 such that battery voltage VB attains reference voltage VBr.

When the amount of power generation by three solar batteries 12 is smaller than load power PL, power is supplied from commercial AC power source 11 to power feed line 3 through AC/DC converter 2, and DC voltage VD on power feed line 3 is maintained at reference voltage VDr. Conversely, when the amount of power generation by three solar batteries 12 is larger than load power PL, power is supplied from power feed line 3 to commercial AC power source 11 through AC/DC converter 2, and DC voltage VD on power feed line 3 is maintained at reference voltage VDr. DC load 14 is driven by DC power from power feed line 3.

When a power failure of commercial AC power source 11 occurs, power failure detector 24 (FIG. 2) of control circuit 4 sets power failure detection signal DP to "L" level that is the active level. When power failure detection signal DP is set to "L" level, controller 25 turns off switch 1, and commercial AC power source 11 is cut off from AC/DC converter 2. Controller 25 (FIG. 2) stops the operation of AC/DC converter 2. Thus, outflow of power from power feed line 3 to commercial AC power source 11 through AC/DC converter 2 and switch 1 is prevented.

Furthermore, when power failure detection signal DP is set to "L" level, selector 51 (FIG. 7) sets the select signal (in this case S1) subsequent to the select signal previously set to "H" level (for example S3) to "H" level. DC/DC converter 45 (FIG. 4, FIG. 8) of power conditioner 6A corresponding to the select signal set to "H" level (in this case S1) supplies DC power of the corresponding battery 13 to power feed line 3. Controller 46A (FIG. 8) of the corresponding power conditioner 6A controls DC/DC converter 45 such that DC voltage VD on power feed line 3 attains reference voltage VDr.

DC/DC converter 45 (FIG. 4, FIG. 8) of power conditioner 6A corresponding to the select signal set to "L" level (in this case S2 or S3) supplies DC power on power feed line 3 to battery 13. Controller 46A (FIG. 8) of the corresponding power conditioner 6A controls DC/DC converter 45 such that terminal-to-terminal voltage VB of battery 13 attains reference voltage VBr and outputs a signal P2f (or P3f) indicating power P2 (or P3) supplied to battery 13 to power conditioner 5A.

Computing unit 33 (FIG. 3, FIG. 9) of each power conditioner 5B determines a load power PL=VD×IL, computing unit 55 (FIG. 9) determines a power Pb necessary for charging two batteries 13, and command unit 35A (FIG. 9) generates a power generation amount command value Pc=(PL−Pa+Pb)/3.

Controller 37 (FIG. 3, FIG. 9) controls DC/DC converter 36 such that the amount of power generation Po by solar battery 12 attains a smaller one of the power generation amount command value Pc and the amount of power generation Pmax determined by maximum power tracking control. At this time, the amount of power generation by three solar batteries 12 (3×Po) is smaller than the sum (PL+Pb) of load power PL and power Pb necessary for charging two batteries 13, but the shortage is filled by one battery 13.

Specifically, DC power of battery 13 corresponding to the select signal at "H" level (in this case S1) is supplied to power feed line 3 through DC/DC converter 45 (FIG. 4, FIG. 8) of power conditioner 6A. Controller 46A (FIG. 8) controls DC/DC converter 45 such that DC voltage VD on power feed line 3 attains reference voltage VDr.

When a predetermined time has passed since occurrence of a power failure, selector 51 (FIG. 7) raises the subsequent select signal (in this case S2) to "H" level, and similar operation is performed. When a predetermined time has further passed, selector 51 (FIG. 7) raises the subsequent select signal (in this case S3) to "H" level, and similar operation is performed. Therefore, even when a power failure of commercial AC power source 11 occurs, the operation of DC load 14 can be continued in a period in which DC power is left in three batteries 13.

As described above, in this third embodiment, in a power failure of commercial AC power source 11, two batteries 13 are charged by DC power generated by solar battery 12, so that the use efficiency of solar battery 12 can be enhanced, compared with the first embodiment.

Fourth Embodiment

Figure 10:
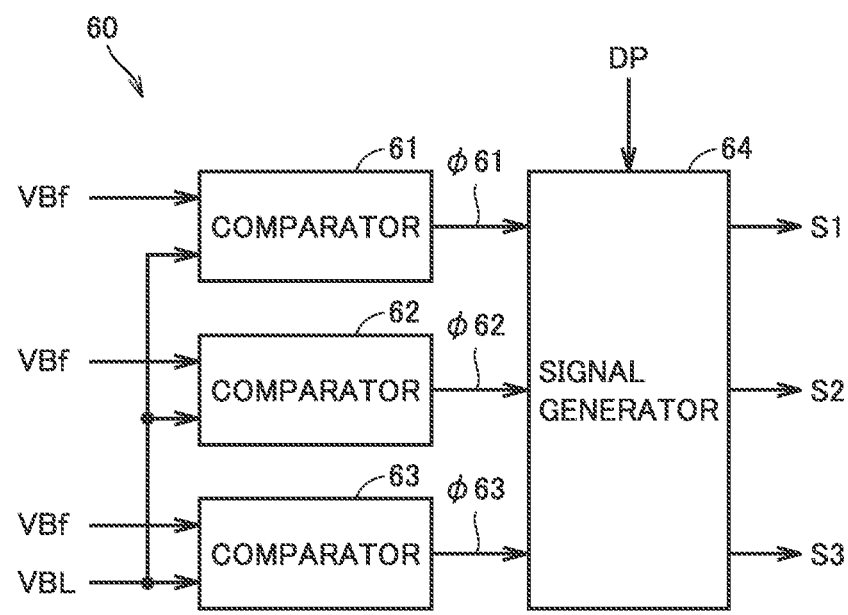
FIG. 10 is a circuit block diagram showing a main part of a DC power feeding device according to a fourth embodiment.

FIG. 10 is a block diagram showing a main part of a DC power feeding device according to a fourth embodiment, in comparison with FIG. 7. Referring to FIG. 10, this DC power feeding device differs from the DC power feeding device in the third embodiment in that selector 51 is replaced by a selector 60. Selector 60 includes comparators 61 to 63 and a signal generator 64.

Comparators 61 to 63 are provided respectively corresponding to voltage detectors 41 (FIG. 8) of three power conditioners 6A. Comparators 61 to 63 respectively compare the level of battery voltages VB indicated by output signals VBf of three voltage detectors 41 with the level of a lower limit voltage VBL and respectively output signals $\phi 61$ to $\phi 63$ indicating a comparison result. When VB>VBL, signals $\phi 61$ to $\phi 63$ are set to "H" level, and when VB≤VBL, signals $\phi 61$ to $\phi 63$ are set to "L" level.

When power failure detection signal DP is at "H" level (in a normal state of commercial AC power source 11), signal generator 64 maintains each of select signals S1 to S3 at "L" level. On the other hand, when power failure detection signal DP is at "L" level (in a power failure of commercial AC power source 11), signal generator 64 sets select signals S1 to S3 to "H" level successively, based on output signals $\phi 61$ to $\phi 63$ of comparators 61 to 63.

Specifically, signal generator 64 stores the select signal previously set to "H" level (for example S2). In response to power failure detection signal DP being set to "L" level, signal generator 64 raises the select signal (in this case S3) subsequent to the select signal previously set to "H" level (in this case S2) to "H" level.

When output signal $\phi 63$ of the comparator (in this case 63) corresponding to the select signal at "H" level (in this case S3) is lowered from "H" level to "L" level, signal generator 64 lowers the select signal previously set to "H" level (in this case S3) to "L" level and raises the subsequent select signal (in this case S1) to "H" level.

Subsequently, when output signal $\phi 61$ of the comparator (in this case 61) corresponding to the select signal at "H" level (in this case S1) is lowered from "H" level to "L" level, signal generator 64 lowers the select signal previously set to "H" level (in this case S1) to "L" level and raises the subsequent select signal (in this case S2) to "H" level. Subsequently, select signals S1 to S3 are successively set to "H" level one by one, similarly, when power failure detection signal DP is at "L" level (in a power failure of commercial AC power source 11). The other configuration and operation is the same as that of the third embodiment and a description thereof will not be repeated.

As described above, in this fourth embodiment, when terminal-to-terminal voltage VB of battery 13 reaches lower limit voltage VBL, discharge of the battery 13 is stopped and charge is started, so that the use efficiency of DC power of battery 13 can be enhanced, compared with the third embodiment in which when the discharge time of battery 13 reaches a predetermined time, discharge of the battery 13 is stopped and charge is started.

Fifth Embodiment

Figure 11:
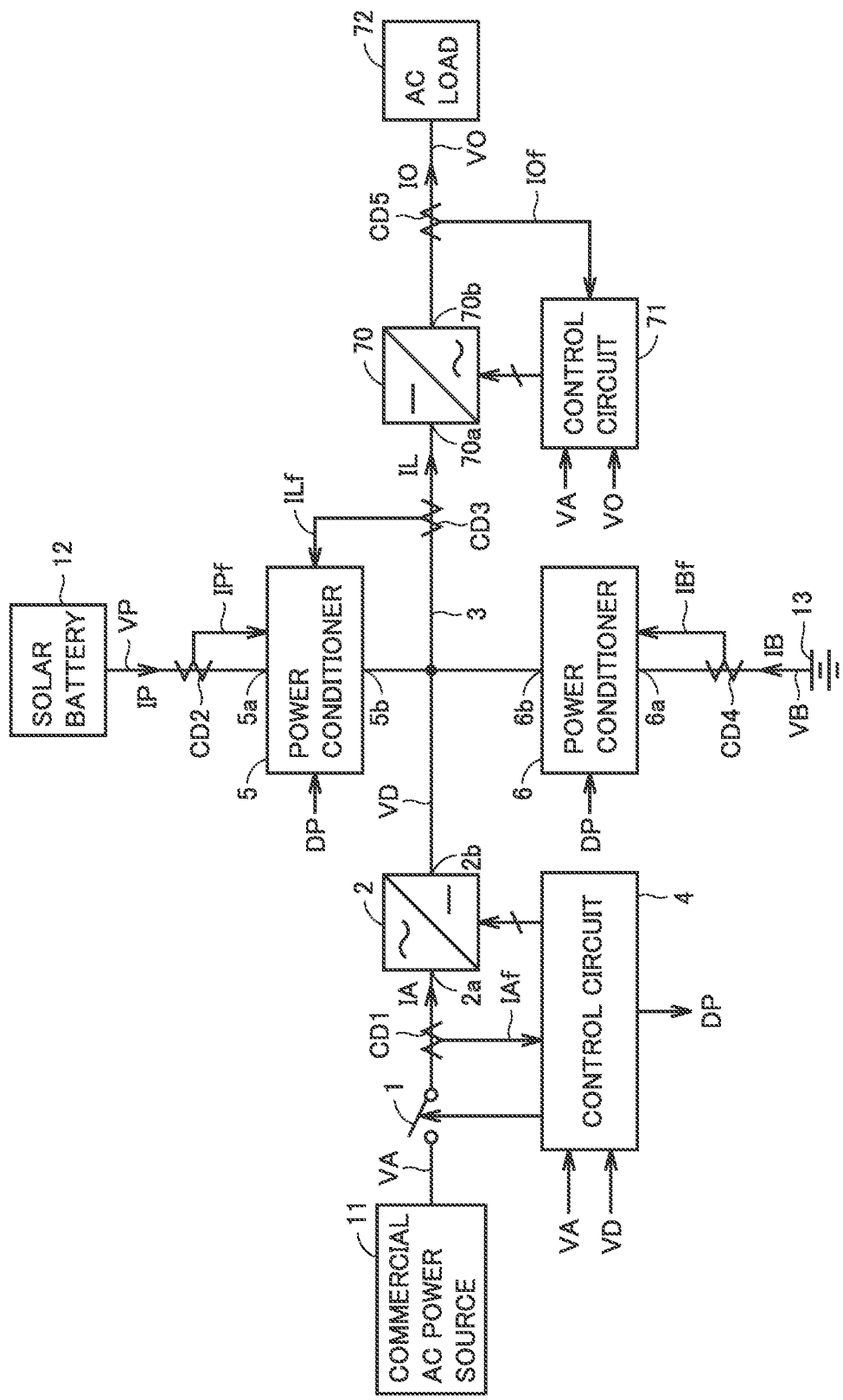
FIG. 11 is a circuit block diagram showing a configuration of an AC power feeding device according to a fifth embodiment.

FIG. 11 is a circuit block diagram showing a configuration of a DC power feeding device according to a fifth embodiment, in comparison with FIG. 1. Referring to FIG. 11, this DC power feeding device differs from the DC power feeding device in the first embodiment in that a DC/AC converter 70, a current detector CD5, and a control circuit 71 are added. This DC power feeding device constitutes an uninterruptible power supply system that supplies AC power to an AC load 72.

DC/AC converter 70 has a DC terminal 70a connected to power feed line 3 and an AC terminal 70b connected to AC load 72. DC/AC converter 70 is controlled by control circuit 71, converts DC voltage VD on power feed line 3 into AC voltage VO having a commercial frequency, and supplies AC voltage VO to AC load 72. AC load 72 is driven by AC power supplied from DC/AC converter 70.

Current detector CD5 detects AC current IO flowing between AC terminal 70b of DC/AC converter 70 and AC load 72 and outputs a signal IOf indicating the detection value to control circuit 71. Control circuit 71 controls DC/AC converter 70, based on AC output voltage VA of commercial AC power source 11, AC output voltage VO of DC/AC converter 70, and output signal IOf of current detector CD5.

Figure 12:
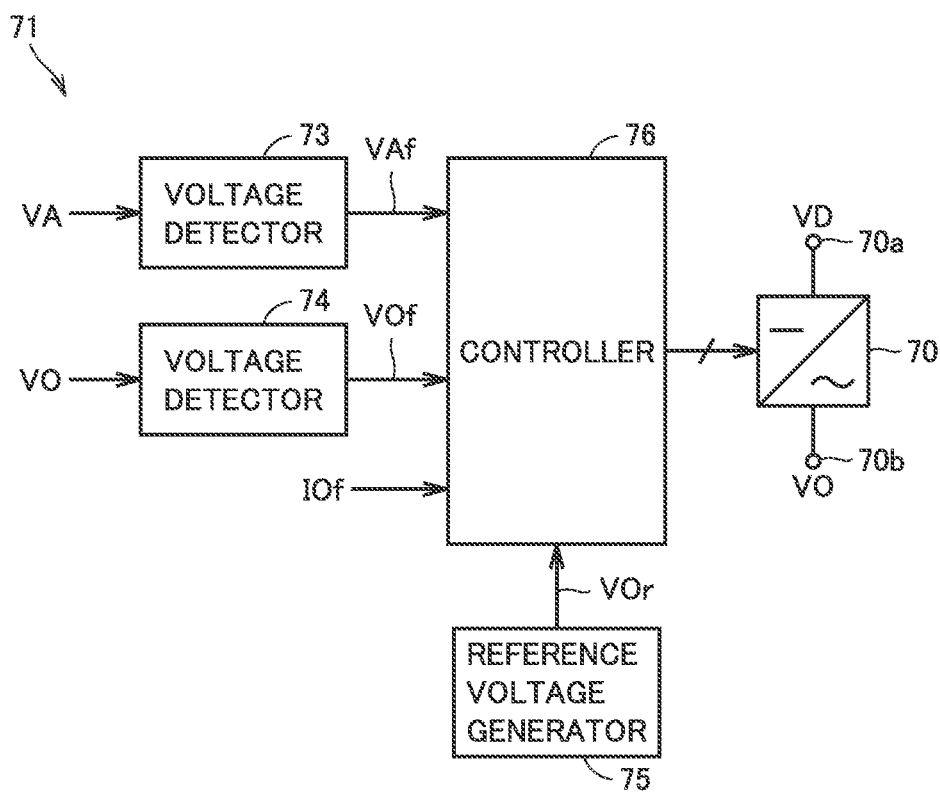
FIG. 12 is a block diagram showing a configuration of a control circuit 71 shown in FIG. 11.

FIG. 12 is a block diagram showing a configuration of control circuit 71. In FIG. 12, control circuit 71 includes voltage detectors 73 and 74, a reference voltage generator 75, and a controller 76. Voltage detector 73 detects an instantaneous value of AC voltage VA of commercial AC power source 11 and outputs a signal VAf indicating the detection value to controller 76. Voltage detector 73 may be removed, and output signal VAf of voltage detector 21 (FIG. 2) may be supplied to controller 76.

Voltage detector 74 detects an instantaneous value of AC output voltage VO of DC/AC converter 70 and outputs a signal VOf indicating the detection value to controller 76. Reference voltage generator 75 outputs reference voltage VOr sinusoidally changing with a commercial frequency to controller 76.

Controller 76 controls DC/AC converter 70 such that AC output voltage VO of DC/AC converter 70 attains reference voltage VOr, based on output signals Vaf and Vof of voltage detectors 73 and 74, output signal IOf of current detector CD5, and reference voltage VOr.

The operation of this uninterruptible power supply system will now be described. In a normal state of commercial AC power source 11, power failure detector 24 (FIG. 2) sets power failure detection signal DP to "H" level, switch 1 is turned on, and commercial AC power source 11 is connected to AC/DC converter 2 through switch 1. AC/DC converter 2 provides and receives power between commercial AC power source 11 and power feed line 3 such that DC voltage VD on power feed line 3 attains reference voltage VDr.

Solar light is converted by solar battery 12 into DC power, and the DC power is supplied to power feed line 3 through power conditioner 5. At this time, power conditioner 5 performs maximum power tracking control of solar battery 12.

Furthermore, DC power on power feed line 3 is supplied to battery 13 through power conditioner 6 to charge battery 13. At this time, power conditioner 6 charges battery 13 such that terminal-to-terminal voltage VB of battery 13 attains reference voltage VBr. DC voltage VD on power feed line 3 is converted by DC/AC converter 70 into AC voltage VO having a commercial frequency, and the AC voltage VO is supplied to AC load 72 to bring AC load 72 into operation.

When a power failure of commercial AC power source 11 occurs, power failure detector 24 (FIG. 2) sets power failure detection signal DP to "L" level, switch 1 is turned off, and the operation of AC/DC converter 2 is stopped.

A smaller one of the power smaller than load power PL by a predetermined power Pa or the power by maximum power tracking control is supplied from solar battery 12 to power feed line 3 through power conditioner 5, and DC power of battery 13 is supplied to power feed line 3 through power conditioner 6. At this time, power conditioner 6 controls output power of battery 13 such that DC voltage VD on power feed line 3 attains reference voltage VDr.

DC voltage VD on power feed line 3 is converted by DC/AC converter 70 into AC voltage VO having a commercial frequency, and the AC voltage VO is supplied to AC load 72 to bring AC load 72 into operation. Therefore, even when a power failure of commercial AC power source 11 occurs, the operation of AC load 72 can be continued in a period in which DC power is left in battery 13.

This fifth embodiment also achieves the same effect as in the first embodiment.

Sixth Embodiment

Figure 13:
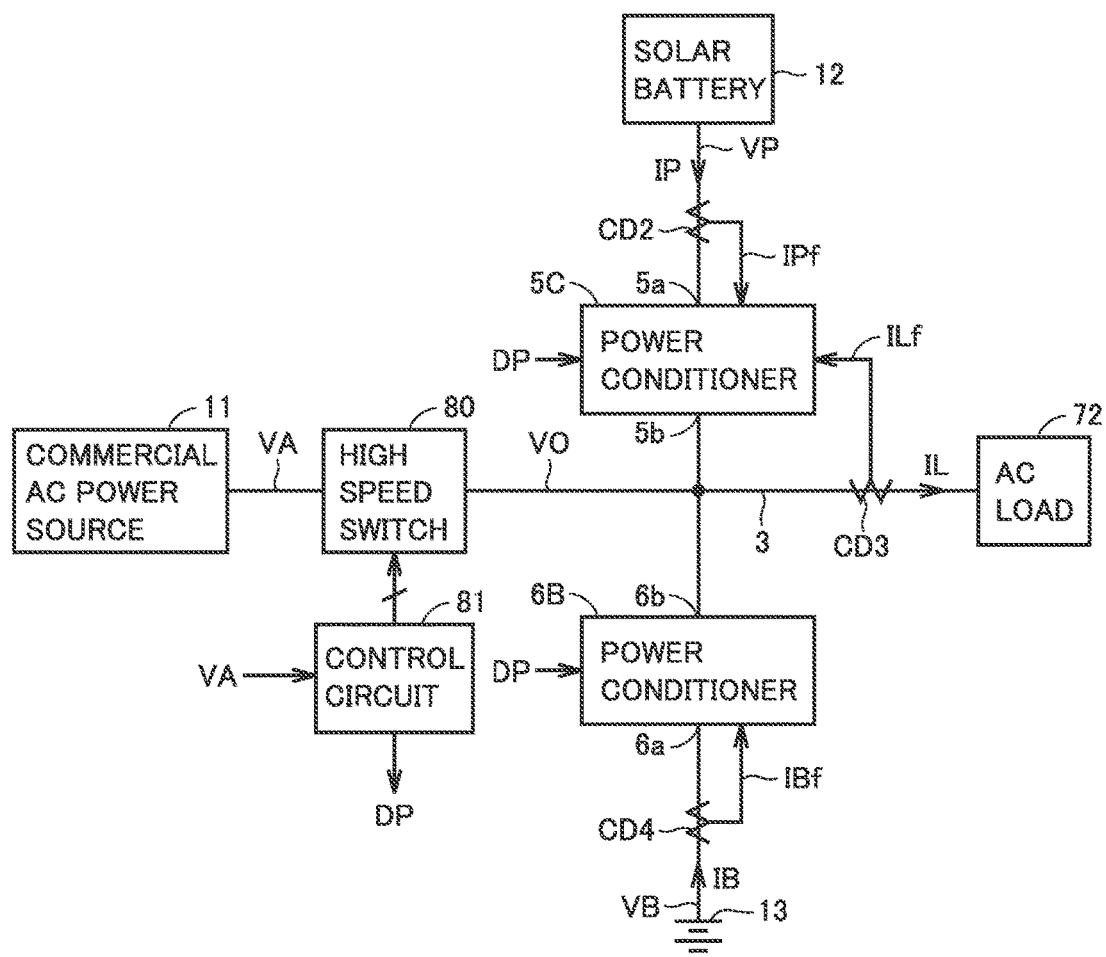
FIG. 13 is a circuit block diagram showing a configuration of an AC power feeding device according to a sixth embodiment.

FIG. 13 is a circuit block diagram showing a configuration of an AC power feeding device according to a sixth embodiment, in comparison with FIG. 1. Referring to FIG. 13, this AC power feeding device differs from the DC power feeding device in the first embodiment in that switch 1, current detector CD1, AC/DC converter 2, and control circuit 4 are replaced by a high speed switch 80 and a control circuit 81, and power conditioners 5 and 6 are replaced by power conditioners 5C and 6B, respectively.

This AC power feeding device receives power from commercial AC power source 11, solar battery 12, and battery 13 and supplies AC power to AC load 72. The AC power feeding device, solar battery 12, and battery 13 constitute an embodiment of the power feeding system.

High speed switch 80 has one terminal receiving AC voltage VA supplied from commercial AC power source 11 and the other terminal connected to AC load 72 through power feed line 3. The on and off of high speed switch 80 is controlled by control circuit 81. High speed switch 80 is a semiconductor switch with a high response speed. In a normal state of commercial AC power source 11, high speed switch 80 is turned on. In a power failure of commercial AC power source 11, high speed switch 80 is turned off.

Control circuit 81 controls high speed switch 80 based on AC voltage VA supplied from commercial AC power source 11 and generates and outputs power failure detection signal DP to power conditioners 5C and 6B.

Figure 14:
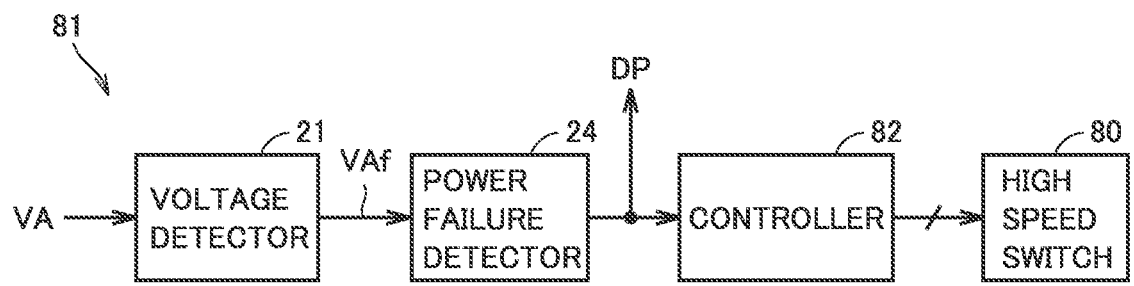
FIG. 14 is a block diagram showing a configuration of a control circuit shown in FIG. 13.

FIG. 14 is a block diagram showing a configuration of control circuit 81, in comparison with FIG. 2. Referring to FIG. 14, control circuit 81 differs from control circuit 4 in that voltage detector 22 and reference voltage generator 23 are removed and controller 25 is replaced by controller 82.

When power failure detection signal DP is at "H" level (in a normal state of commercial AC power source 11), controller 82 turns on high speed switch 80. When power failure detection signal DP is at "L" level (in a power failure of commercial AC power source 11), controller 82 turns off high speed switch 80.

Referring to FIG. 13 again, power conditioner 5C controls power supplied form solar battery 12 to power feed line 3, based on power failure detection signal DP, DC output voltage VP of solar battery 12, and output signals IPf and ILf of current detectors CD2 and CD3.

Figure 15:
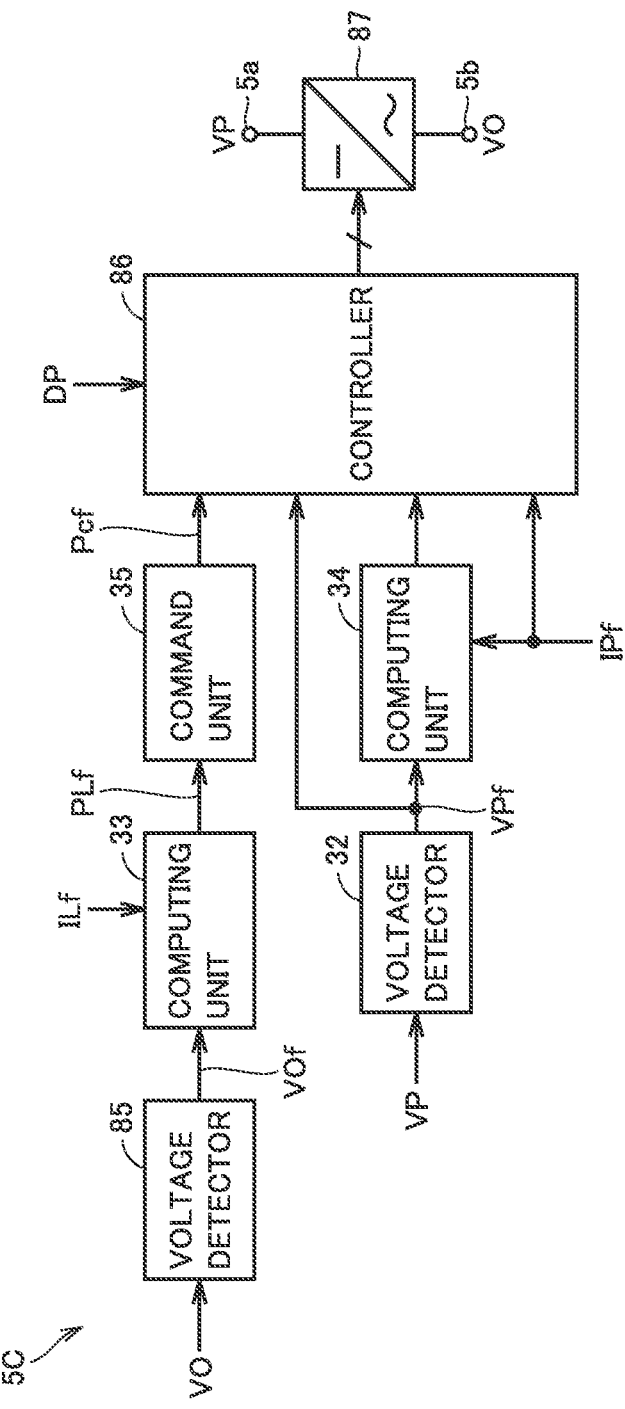
FIG. 15 is a block diagram showing a configuration of a power conditioner 5C shown in FIG. 13.

FIG. 15 is a block diagram showing a configuration of power conditioner 5C, in comparison with FIG. 3. Referring to FIG. 15, power conditioner 5C differs from power conditioner 5 in that voltage detector 31, controller 37, and DC/DC converter 36 are replaced by a voltage detector 85, a controller 86, and a DC/AC converter 87, respectively.

Voltage detector 31 detects an instantaneous value of AC voltage VO on power feed line 3 and outputs a signal VOf indicating the detection value to computing unit 33. Computing unit 33 determines power consumption PL of AC load 72=VO×IL, based on AC voltage VO on power feed line 3 indicated by output signal VOf of voltage detector 85 and load current IL indicated by output signal ILf of current detector CD3 and outputs a signal PLf indicating the determined load power PL to command unit 35.

Command unit 35 determines a power generation amount command value Pc=PL−Pa, which is smaller than load power PL indicated by output signal PLf of computing unit 33 by a predetermined power Pa (for example 1 kW), and outputs a signal indicating the determined power generation amount command value Pc to controller 86.

DC/AC converter 87 is connected between input terminal 5a and output terminal 5b (FIG. 1, FIG. 13) and controlled by controller 86, converts DC output voltage VP of solar battery 12 into AC voltage VO, and outputs AC voltage VO to power feed line 3.

When power failure detection signal DP is at "H" level (in a normal state of commercial AC power source 11), controller 86 performs maximum power tracking control of solar battery 12. Specifically, controller 86 controls DC/AC converter 87 such that DC output power Po of solar battery 12 is maximized, based on DC output voltage VP, DC output current IP, and DC output power Po of solar battery 12.

On the other hand, when power failure detection signal DP is at "L" level (in a power failure of commercial AC power source 11), controller 86 controls DC/AC converter 87 such that DC output power Po of solar battery 12 attains a smaller one of the power generation amount command value Pc or the amount of power generation Pmax determined by maximum power tracking control, based on the power generation amount command value Pc, and DC output voltage VP, DC output current IP, and DC output power Po of solar battery 12.

Referring to FIG. 13 again, power conditioner 6B provides and receives power between power feed line 3 and battery 13, based on power failure detection signal DP, terminal-to-terminal voltage VB of battery 13, output signal IBf of current detector CD4, and AC voltage VO on power feed line 3.

Figure 16:
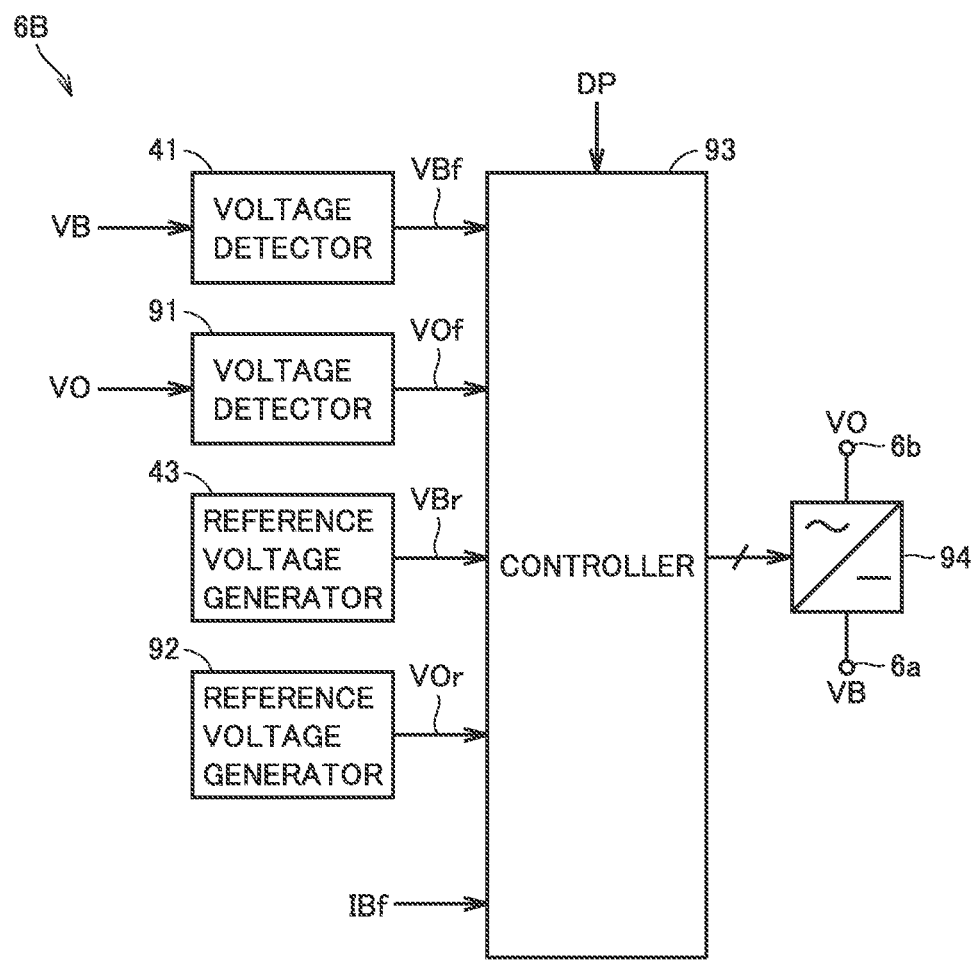
FIG. 16 is a block diagram showing a configuration of a power conditioner 6B shown in FIG. 13.

FIG. 16 is a block diagram showing a configuration of power conditioner 6B, in comparison with FIG. 4. Referring to FIG. 16, power conditioner 6B differs from power conditioner 6 in that voltage detector 42, reference voltage generator 44, controller 40, and DC/DC converter 45 are replaced by a voltage detector 91, a reference voltage generator 92, a controller 93, and a DC/AC converter 94, respectively.

Voltage detector 91 detects AC voltage VO on power feed line 3 and outputs a signal VOf indicating the detection value to controller 93. Voltage detector 91 may be removed, and output signal VOf of voltage detector 85 (FIG. 15) may be supplied to controller 93.

Reference voltage generator 92 outputs reference voltage VOr sinusoidally changing with a commercial frequency to controller 93. DC/AC converter 94 is connected between input terminal 6a and output terminal 6b (FIG. 1) and controlled by controller 93, and provides and receives power between power feed line 3 and battery 13.

When power failure detection signal DP is at "H" level (in a normal state of commercial AC power source 11), controller 93 controls DC/AC converter 94 such that battery voltage VB attains reference voltage VBr, based on battery voltage VB, AC voltage VO on power feed line 3, and battery current IB indicated by output signals VBf and VOf of voltage detectors 41 and 91 and output signal IBf of current detector CD4, and reference voltage VBr.

DC/AC converter 94 may be controlled so that power is provided and received between battery 13 and commercial AC power source 11 (power system) and peak-cut and peak-shift of power consumption in the power system are performed.

On the other hand, when power failure detection signal DP is at "L" level (in a power failure of commercial AC power source 11), controller 93 controls DC/AC converter 94 such that AC voltage VO on power feed line 3 attains reference voltage VOr, based on battery voltage VB, AC voltage VO on power feed line 3, and battery current IB indicated by output signals VBf and VOf of voltage detectors 41 and 91 and output signal IBf of current detector CD4, and reference voltage VOr.

The operation of this DC power feeding device will now be described. In a normal state of commercial AC power source 11, power failure detector 24 (FIG. 2, FIG. 14) of control circuit 81 sets power failure detection signal DP to "H" level that is the inactive level.

When power failure detection signal DP is set to "H" level, controller 82 turns on high speed switch 80, and AC voltage VA of commercial AC power source 11 is supplied to power feed line 3 through high speed switch 80.

Furthermore, when power failure detection signal DP is set to "H" level, controller 86 (FIG. 15) of power conditioner 5 performs maximum power tracking control of solar battery 12, and DC power generated by solar battery 12 is supplied to power feed line 3 through DC/AC converter 87 (FIG. 15). Furthermore, computing unit 33 (FIG. 3, FIG. 15) determines a load power PL=VO×IL, and command unit 35 (FIG. 3, FIG. 15) generates a power generation amount command value Pc=PL−Pa, which is smaller than load power PL by a predetermined power Pa.

Furthermore, when power failure detection signal DP is set to "H" level, power on power feed line 3 is supplied to battery 13 through DC/AC converter 94 (FIG. 16) of power conditioner 6B to charge battery 13. Controller 93 (FIG. 16) controls DC/AC converter 94 such that battery voltage VB attains reference voltage VBr.

When the amount of power generation by solar battery 12 is smaller than load power PL, a shortage of AC power is supplied from commercial AC power source 11 to power feed line 3 through high speed switch 80. Conversely, when the amount of power generation by solar battery 12 is larger than load power PL, an excess of AC power is supplied from power feed line 3 to commercial AC power source 11 through high speed switch 80. AC load 72 is driven by AC power from power feed line 3.

When a power failure of commercial AC power source 11 occurs, power failure detector 24 (FIG. 2, FIG. 14) of control circuit 81 sets power failure detection signal DP to "L" level that is the active level. When power failure detection signal DP is set to "L" level, controller 82 instantaneously turns off high speed switch 80 to cut off commercial AC power source 11 from power feed line 3. Thus, outflow of power from power feed line 3 to commercial AC power source 11 through high speed switch 80 is prevented.

Furthermore, when power failure detection signal DP is set to "L" level, controller 86 (FIG. 15) of power conditioner 5C controls DC/AC converter 87 such that the amount of power generation Po by solar battery 12 attains a smaller one of the power generation amount command value Pc=PL−Pa or the amount of power generation Pmax determined by maximum power tracking control. At this time, the amount of power generation Po by solar battery 12 is smaller than load power PL, but the shortage is filled by battery 13.

Specifically, when power failure detection signal DP is set to "L" level, DC power of battery 13 is supplied to power feed line 3 through DC/AC converter 94 (FIG. 16) of power conditioner 6B. Controller 93 (FIG. 16) controls DC/AC converter 94 such that AC voltage VO on power feed line 3 attains reference voltage VOr. Therefore, even when a power failure of commercial AC power source 11 occurs, the operation of AC load 72 can be continued in a period in which DC power is left in battery 13.

As described above, in this sixth embodiment, in a power failure of commercial AC power source 11, DC/AC converter 87 is controlled such that solar battery 12 outputs DC power Pc smaller than load power PL, and DC/AC converter 94 is controlled such that AC voltage VO of power feed line 3 attains reference voltage VOr. Therefore, even when the amount of power generation by solar battery 12 is smaller than load power PL due to weak solar light, DC power generated by solar battery 12 can be used, and the use efficiency of solar battery 12 in a power failure can be enhanced.

It is needless to say that the foregoing first to sixth embodiments can be combined as appropriate. For example, the sixth embodiment and the third embodiment may be combined, and N sets of power conditioner and current detector CD4 corresponding to N batteries 13 and M sets of power conditioner and current detector CD2 corresponding to M solar batteries 12 may be provided.

In this case, in a power failure of commercial AC power source 11, N power conditioners are successively selected one by one, the selected power conditioner converts DC power of the corresponding battery 13 into AC power and supplies the AC power to power feed line 3, and each of the power conditioners not selected converts AC power from power feed line 3 into DC power and stores the DC power in the corresponding battery 13.

M power conditioners supply a power smaller than a load power PL by a predetermined power Pa and larger by a power Pb necessary for charging (N−1) batteries 13, from M solar batteries 12 to power feed line 3.

Figure 17:
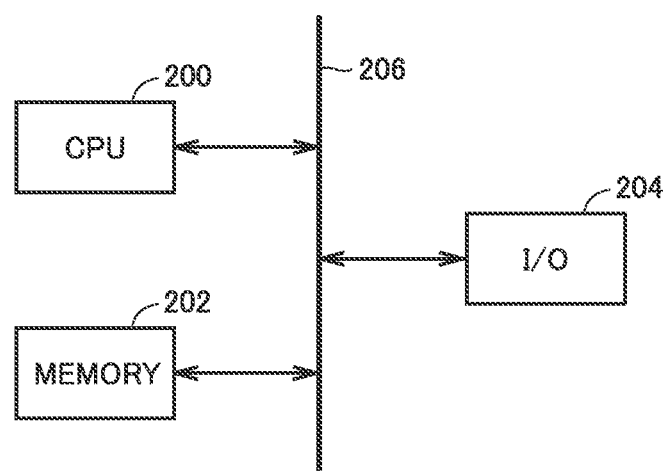
FIG. 17 is a block diagram showing a hardware configuration example of the control circuit.

In the DC power feeding device according to the foregoing first to sixth embodiments, control circuits 4, 71, 81 and the control circuits included in power conditioners 5, 5A to 5C, 6, 6A, 6B are typically configured with a microcomputer storing a predetermined program in advance. FIG. 17 is a block diagram showing a hardware configuration example of the control circuit. In the example in FIG. 17, the control circuit includes a central processing unit (CPU) 200, a memory 202, and an input/output (I/O) circuit 204. CPU 200, memory 202, and I/O circuit 204 can provide and receive data to and from each other through a bus 206. A program is stored in a partial area of memory 202, and CPU 200 executes the program to implement a variety of functions described later. I/O circuit 204 inputs and outputs signals and data to and from the outside of the control device.

Alternatively, unlike the example of FIG. 17, at least a part of the control circuit may be configured using a circuit such as a field programmable gate array (FPGA) or an application specific integrated circuit (ASIC). Alternatively, at least a part of the control circuit may be configured with an analog circuit.

In this way, the functions of the blocks shown in FIG. 2 to FIG. 5, FIG. 7 to FIG. 10, FIG. 12, and FIG. 14 to FIG. 16 can be implemented by at least one of software processing and hardware processing by the control circuit.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power feeding device comprising:
a power feed line that supplies power from a power source to a load;
a first power converter that supplies power generated by a solar battery to the power feed line;
at least one second power converter that provides and receives power between at least one power storage device and the power feed line;
a first controller that controls the first power converter in a normal state of the power source such that output of the solar battery is maximized, and controls the first power converter in a power failure of the power source such that the solar battery outputs a first power smaller than a load power; and
at least one second controller that controls the at least one second power converter in the normal state of the power source such that a terminal-to-terminal voltage of the at least one power storage device attains a first reference voltage, and controls the second power converter in the power failure of the power source such that a voltage on the power feed line attains a second reference voltage.

2. The power feeding device according to claim 1, wherein when the voltage on the power feed line becomes higher than a predetermined upper limit voltage in the power failure of the power source, the first controller controls the first power converter such that the solar battery outputs a power smaller than the first power.

3. The power feeding device according to claim 1, wherein
the at least one second power converter comprises N second power converters that respectively provide and receive power between N power storage devices and the power feed line,
the at least one second controller comprises N second controllers that respectively control the N second power converters, and
the power feeding device further comprises a selector that successively selects the N second controllers in the power failure of the power source, wherein
N is an integer equal to or greater than two,
each of the N second controllers
when not being selected by the selector, controls the corresponding second power converter to charge the corresponding power storage device such that a terminal-to-terminal voltage of the corresponding power storage device attains the first reference voltage, and
when being selected by the selector, controls the corresponding second power converter to discharge the corresponding power storage device such that the voltage on the power feed line attains the second reference voltage.

4. The power feeding device according to claim 2, wherein
the at least one second power converter comprises N second power converters that respectively provide and receive power between N power storage devices and the power feed line,
the at least one second controller comprises N second controllers that respectively control the N second power converters, and
the power feeding device further comprises a selector that successively selects the N second controllers in the power failure of the power source, wherein
N is an integer equal to or greater than two,
each of the N second controllers
when not being selected by the selector, controls the corresponding second power converter to charge the corresponding power storage device such that a terminal-to-terminal voltage of the corresponding power storage device attains the first reference voltage, and
when being selected by the selector, controls the corresponding second power converter to discharge the corresponding power storage device such that the voltage on the power feed line attains the second reference voltage.

5. The power feeding device according to claim 3, wherein in the power failure of the power source, the first controller controls the first power converter such that the solar battery outputs a third power that is a sum of the first power and a second power necessary for charging (N−1) power storage devices corresponding to (N−1) second controllers not selected by the selector.

6. The power feeding device according to claim 4, wherein in the power failure of the power source, the first controller controls the first power converter such that the solar battery outputs a third power that is a sum of the first power and a second power necessary for charging (N−1) power storage devices corresponding to (N−1) second controllers not selected by the selector.

7. The power feeding device according to claim 3, wherein every time a predetermined time has passed, the selector selects the second controller different from the second controller selected at present.

8. The power feeding device according to claim 4, wherein every time a predetermined time has passed, the selector selects the second controller different from the second controller selected at present.

9. The power feeding device according to claim 5, wherein every time a predetermined time has passed, the selector selects the second controller different from the second controller selected at present.

10. The power feeding device according to claim 6, wherein every time a predetermined time has passed, the selector selects the second controller different from the second controller selected at present.

11. The power feeding device according to claim 3, wherein in response to that the terminal-to-terminal voltage of the power storage device corresponding to the second controller selected at present becomes lower than a predetermined lower limit voltage, the selector selects the second controller different from the second controller selected at present.

12. The power feeding device according to claim 4, wherein in response to that the terminal-to-terminal voltage of the power storage device corresponding to the second controller selected at present becomes lower than a predetermined lower limit voltage, the selector selects the second controller different from the second controller selected at present.

13. The power feeding device according to claim 5, wherein in response to that the terminal-to-terminal voltage of the power storage device corresponding to the second controller selected at present becomes lower than a predetermined lower limit voltage, the selector selects the second controller different from the second controller selected at present.

14. The power feeding device according to claim 6, wherein in response to that the terminal-to-terminal voltage of the power storage device corresponding to the second controller selected at present becomes lower than a predetermined lower limit voltage, the selector selects the second controller different from the second controller selected at present.

15. The power feeding device according to claim 1, wherein
the first power converter is a first DC/DC converter, and the at least one second power converter is at least one second DC/DC converter,
the second reference voltage is a predetermined DC voltage,
the power source is an AC/DC converter that provides and receives power between a commercial AC power source and the power feed line,
the normal state of the power source is a normal state of the commercial AC power source, and the power failure of the power source is a power failure of the commercial AC power source, and
the power feeding device further comprises a third controller that controls the AC/DC converter such that the voltage on the power feed line attains the second reference voltage in the normal state of the commercial AC power source, and stops operation of the AC/DC converter in the power failure of the commercial AC power source.

16. The power feeding device according to claim 15, further comprising a DC/AC converter that converts DC power received from the power feed line into AC power and supplies the AC power to an AC load.

17. The power feeding device according to claim 1, wherein
the first power converter is a first DC/AC converter that converts DC power generated by the solar battery into AC power and supplies the AC power to the power feed line,
the at least one second power converter is at least one second DC/AC converter that provides and receives power between the at least one power storage device and the power feed line,
the second reference voltage is a predetermined AC voltage,
the power source is a commercial AC power source,
the normal state of the power source is a normal state of the commercial AC power source, and the power failure of the power source is a power failure of the commercial AC power source, and
the power feeding device further comprises a switch connected between the commercial AC power source and the power feed line, the switch being turned on in the normal state of the commercial AC power source and turned off in the power failure of the commercial AC power source.

18. A power feeding system comprising:
the power feeding device according to claim 1;
the solar battery; and
the at least one power storage device.

19. A power feeding system comprising:
the power feeding device according to claim 2;
the solar battery; and
the at least one power storage device.

* * * * *